United States Patent [19]
Nguyen et al.

[11] Patent Number: 6,006,267
[45] Date of Patent: Dec. 21, 1999

[54] METHOD AND SYSTEM FOR CONNECTING NETWORK HOSTS HAVING DIFFERENT COMMUNICATION PROTOCOLS

[75] Inventors: Binh Q. Nguyen; Hung D. Nguyen; Richard J. Redpath, all of Cary; Sandeep K. Singhal, Raleigh, all of N.C.

[73] Assignee: International Business Machines Corp., Armonk, N.Y.

[21] Appl. No.: 08/812,220

[22] Filed: Mar. 6, 1997

[51] Int. Cl.$^6$ ............................. G06F 13/33; G06F 15/17
[52] U.S. Cl. ............................................. 709/227; 709/230
[58] Field of Search ......................... 395/200.57, 200.53, 395/200.68; 370/401, 467; 709/227, 223, 228, 230

[56] References Cited

U.S. PATENT DOCUMENTS

| | | | |
|---|---|---|---|
| 5,485,455 | 1/1996 | Dobbins et al. | 370/255 |
| 5,491,694 | 2/1996 | Oliver et al. | 370/455 |
| 5,519,704 | 5/1996 | Farinacci et al. | 370/402 |
| 5,521,910 | 5/1996 | Matthews | 370/256 |
| 5,727,002 | 3/1998 | Miller et al. | 395/200.67 |
| 5,751,971 | 5/1998 | Dobbins et al. | 395/200.68 |
| 5,805,805 | 9/1998 | Civanlar et al. | 395/200.53 |

*Primary Examiner*—Mark H. Rinehart
*Attorney, Agent, or Firm*—A. Bruce Clay

[57] ABSTRACT

A matrix is created for storing the various verified methods of communication that are available between a plurality of hosts. Each host pair has two or three values stored in the matrix to indicate the known methods of communications between each other. A first value indicates whether unreliable multicast communications are possible, not possible or not yet determined. A second value indicates whether unreliable unicast communications are possible, not possible, or not yet determined. A third optional value may indicate whether reliable unicast communications are possible, not possible, or not yet determined. The mode of communications between each pair of hosts is then selected in the order of unreliable multicast, unreliable unicast, and, finally, reliable unicast.

24 Claims, 8 Drawing Sheets

FIG. 3

METHOD AND SYSTEM FOR CONNECTING NETWORK HOSTS HAVING DIFFERENT COMMUNICATION PROTOCOLS

FIELD OF THE INVENTION

This invention relates in general to computer software, and in particular to a method and system for providing in a networked computing system, connectivity among hosts having different communications capabilities. More particularly, the present invention relates to a method and system by which an application can be deployed over an internet without knowledge of the underlying communications protocols or network security perimeters.

BACKGROUND OF THE INVENTION

Systems for data processing in a network environment commonly exchange and disseminate information among a multitude of hosts. An internetwork environment includes hosts and routers having different communications capabilities. These variations include the ability to send and receive unreliable multicast data and the ability to receive unreliable unicast data. Consequently, a host cannot employ a single means to disseminate data to a large number of hosts. Clearly, determining the most appropriate means for transmitting data to each destination represents a considerable burden for the application programmer.

Therefore, a need exists for a method and system for automatically gathering communications capability information for all hosts and for automatically selecting the most appropriate means for sending data to each destination.

SUMMARY OF THE INVENTION

An object of the present invention is to provide a method for facilitating communications among hosts with different communication protocol capabilities.

Another object of the invention is to facilitate communications despite the presence of network security perimeters or firewalls.

Yet another object of the subject invention is to support these communications environments without exposing the underlying system heterogeneity to the application.

To achieve the foregoing objects and in accordance with the purpose of the invention as broadly described herein, a method and system are disclosed for obtaining and maintaining information about how a multitude of hosts may exchange information with each other. Based on this information, a method and system are disclosed for selecting the most optimal means for disseminating information from any one host to one or more destination hosts. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 3 shows a typical data structure used by the server to maintain reachability information for a set of client hosts;

DETAILED DESCRIPTION OF THE INVENTION

Figure 1:
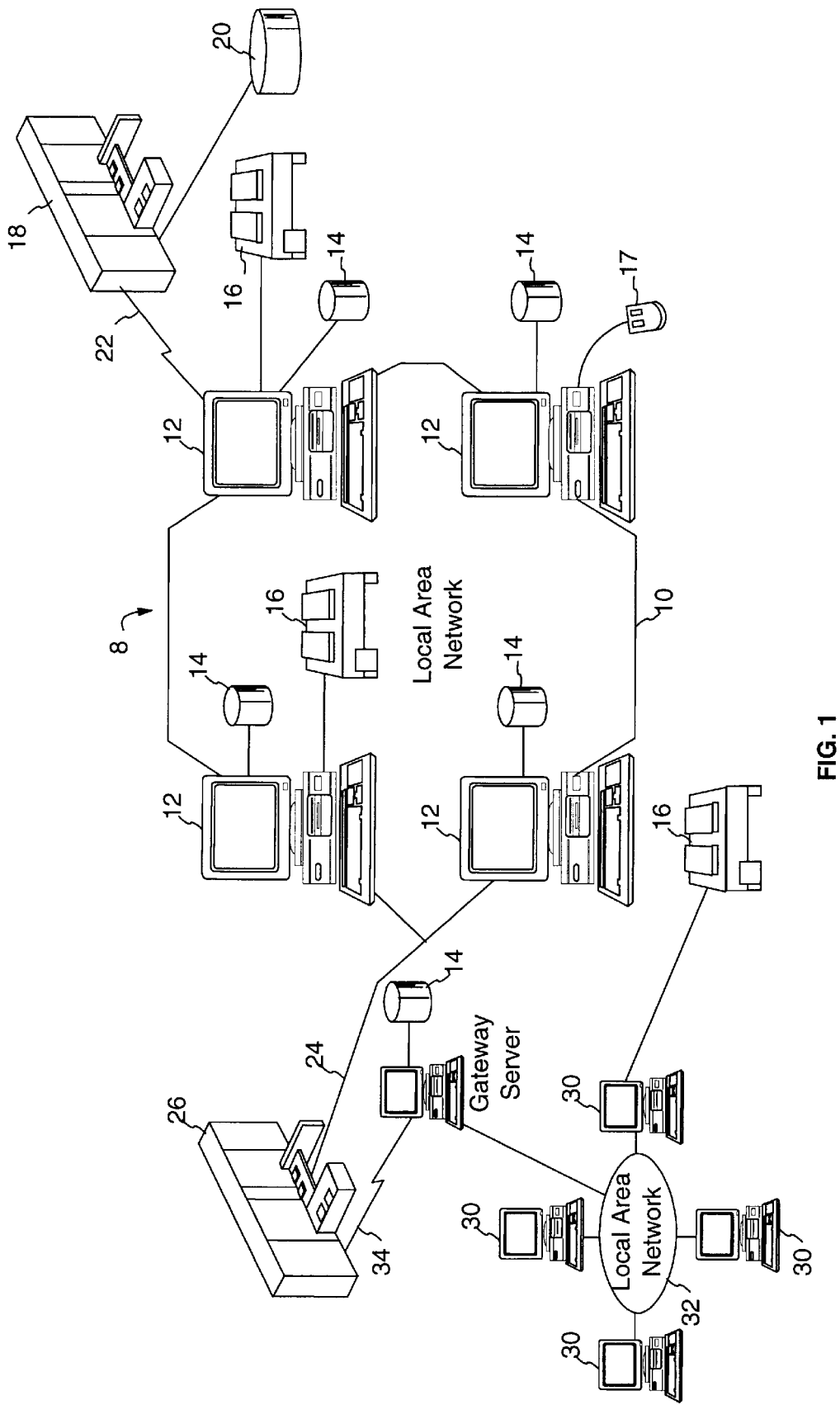
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

An internetwork typically comprises a multitude of independently-managed hosts and networks. Because these systems lack any centralized management, they are by nature heterogeneous, supporting different communications protocols. Most commonly, hosts can communicate using a reliable protocol (ie., connection or stream based protocols such as, for example, TCP/IP, that use acknowledgment packets generated by destination hosts to ensure that transmitted data is actually received). However, these reliable delivery protocols require considerable host computation and network bandwidth resources and are consequently undesirable for disseminating data to many hosts. Often, hosts can also communicate using an unreliable protocol (ie., connectionless packet-based protocol such as, for example, UDP/IP, which only provides a "best-effort" delivery service). These unreliable delivery protocols require less bandwidth and computation than reliable delivery protocols. Furthermore hosts are connected over networks that support multicasting, whereby data may be automatically replicated by the network routers to facilitate the delivery of a single transmission to multiple destination hosts. Multicast transmissions may provide a variety of data delivery capabilities ranging from unreliable delivery to reliable delivery. Although the preferred embodiment of the present invention employs multicast providing unreliable delivery semantics, alternate embodiments may use multicast protocols providing different data delivery semantics. Multicasting is the most efficient means for disseminating data to multiple hosts, but not all hosts are capable of sending and receiving multicast information. Furthermore, some networks are connected to security perimeters or firewalls that may restrict the flow of certain protocols to or from one or more hosts. Commonly, firewalls block all incoming traffic except reliable unicasting over a connection initiated by a host inside the firewall. Firewalls may be implemented in hardware or software on a router or host, or in some combination thereof.

Figure 2:
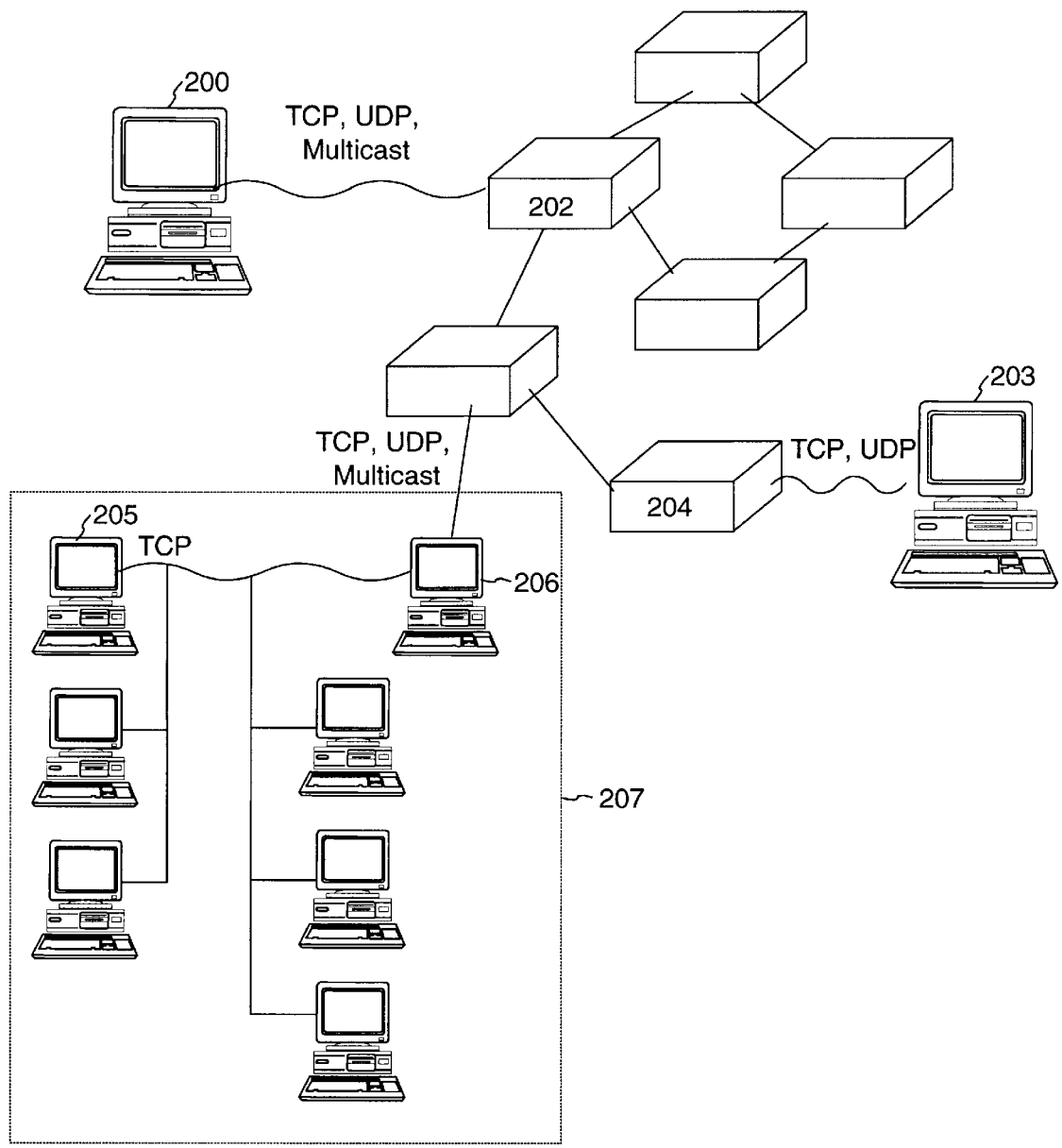
FIG. 2 shows a heterogeneous internetwork with different protocol capabilities and network security perimeters.

Referring now to FIG. 2, we see a heterogeneous internetwork environment containing hosts with varying communications capabilities. Host 200, is directly connected to a multicast-capable router 202 and can transmit and receive unreliable multicast (IP multicast), unreliable unicast (UDP/IP), and reliable unicast (TCP/IP). Host 203 is connected to a limited function router 204 and cannot send or receive multicast data; host 203 must use either unreliable unicast (UDP/IP) or reliable unicast (TCP/IP) to communicate. Host 205 is protected by a firewall host 206 that restricts the flow of certain network traffic to or from the logical security perimeter 207. Consequently, host 205 can only receive reliable unicast (TCP/IP) traffic transmitted over a connection initiated by host 205; the host cannot receive connection-less traffic via either UDP/IP or IP multicast.

In the internetwork environment pictured in FIG. 2, hosts cannot disseminate information to each other using a single scalable protocol. For example, although hosts 200, 203, and 205 can communicate with each other using TCP/IP, the connection-oriented nature of this reliable protocol is unsuitable for high-performance distributed applications with many hosts. Ideally, the hosts would communicate via IP multicast, which provides the best scalability properties, but hosts 203 and 205 cannot employ this protocol.

In the preferred embodiment of the present invention, hosts that participate in a distributed application initiate a connection to a server host which is connected to a multicast-capable router (eg. router 202) and whose communications are not impeded by a firewall security perimeter. In FIG. 2, host 200 would represent such a suitable server host. The server is responsible for determining how host pairs are capable of communicating with each other. When connecting to the server host, the client may optionally provide information about its communications capabilities, including whether it is surrounded by a firewall or other security perimeter, whether it can communicate via unreliable unicast, or whether it can communicate via unreliable multicast.

Figure 3:
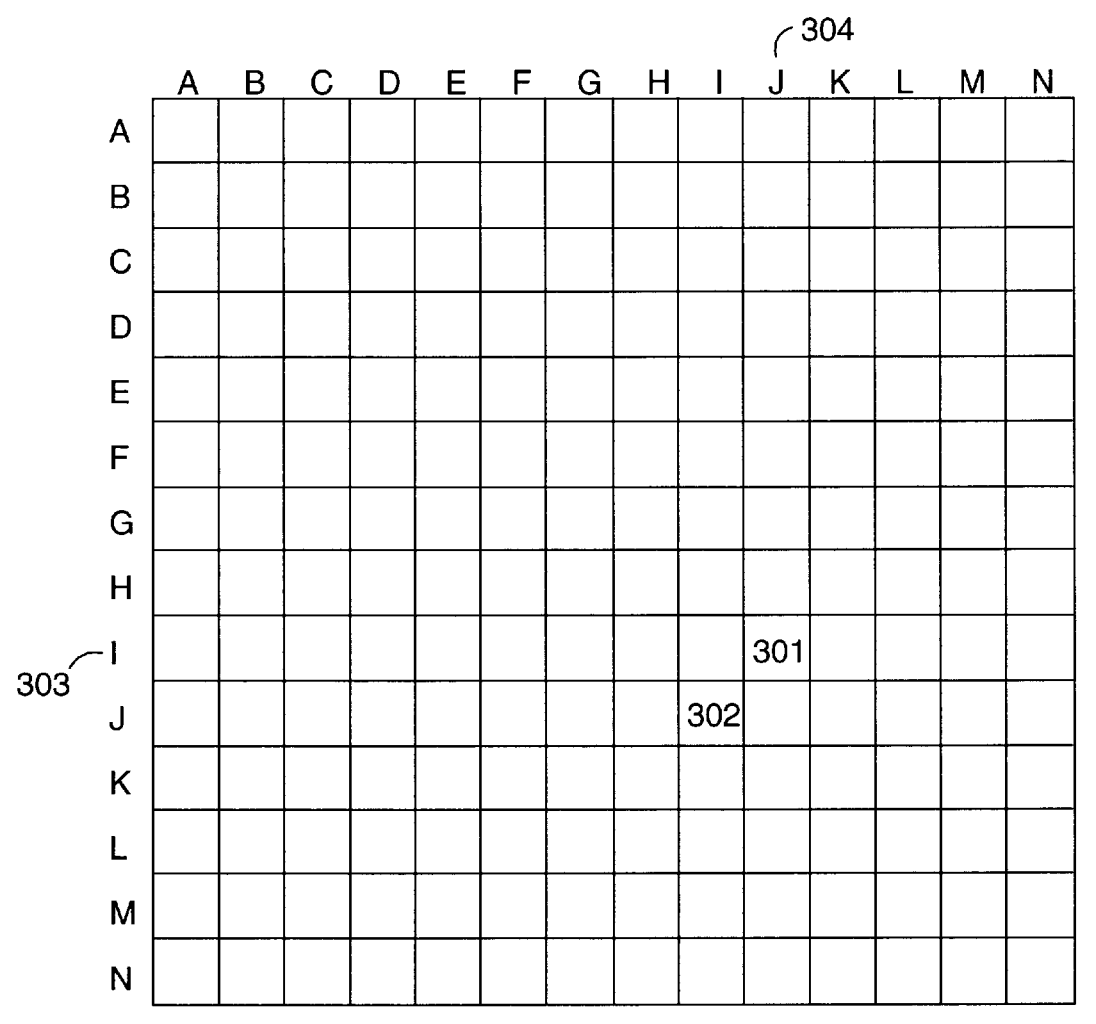

Referring now to FIG. 3, we see a matrix data structure that may be used by the server in the preferred embodiment of this invention. Cell (I,J) identified by reference numeral 301 of this matrix describes the communications protocol employed to enable host I identified by reference numeral 303 to send data to host J identified by reference numeral 304. By assumption, these communications protocols may not be symmetric, in that the protocol used to send data from host I to host J may differ from the protocol used to send data from host J to host I. In other words, the values of cell (I,J) identified by reference numeral 301 and cell (J,I) identified by reference numeral 302 need not be equal. Furthermore, the terms "host I" and "host J" may, in fact, refer to a group of similar hosts, such as machines located on a common LAN.

Each cell (I, J) of the matrix contains two values, a U value and an M value. The U value indicates whether communication may occur via unreliable unicast communication. The M value indicates whether communication may occur via unreliable multicast communication.

The U value of cell (I, J) takes one of the following values:
  -U-? Unreliable unicast communication unconfirmed:
  -U-Y Unreliable unicast communication possible
  -U-N Unreliable unicast communication not possible The U-? value indicates that unreliable unicast communication may be possible from host I to host J but has not yet been confirmed. In the absence of any other information, this value is set as the default. The U-Y value is used when unreliable unicast communications are possible from host I to host J. This value is used as the default if, when registering with the server, both hosts indicate the ability to communicate via unreliable unicast and both hosts indicate the absence of a network firewall perimeter. This value may also be set after a unicast reachability test from host I to host J has succeeded. The U-N value is used when unreliable unicast communications are not possible. This value is used as the default if, when registering with the server, either host indicates that it cannot perform unreliable unicast communication. It may also be set after a unicast reachability test from host I to host J has failed.

Figure 4:
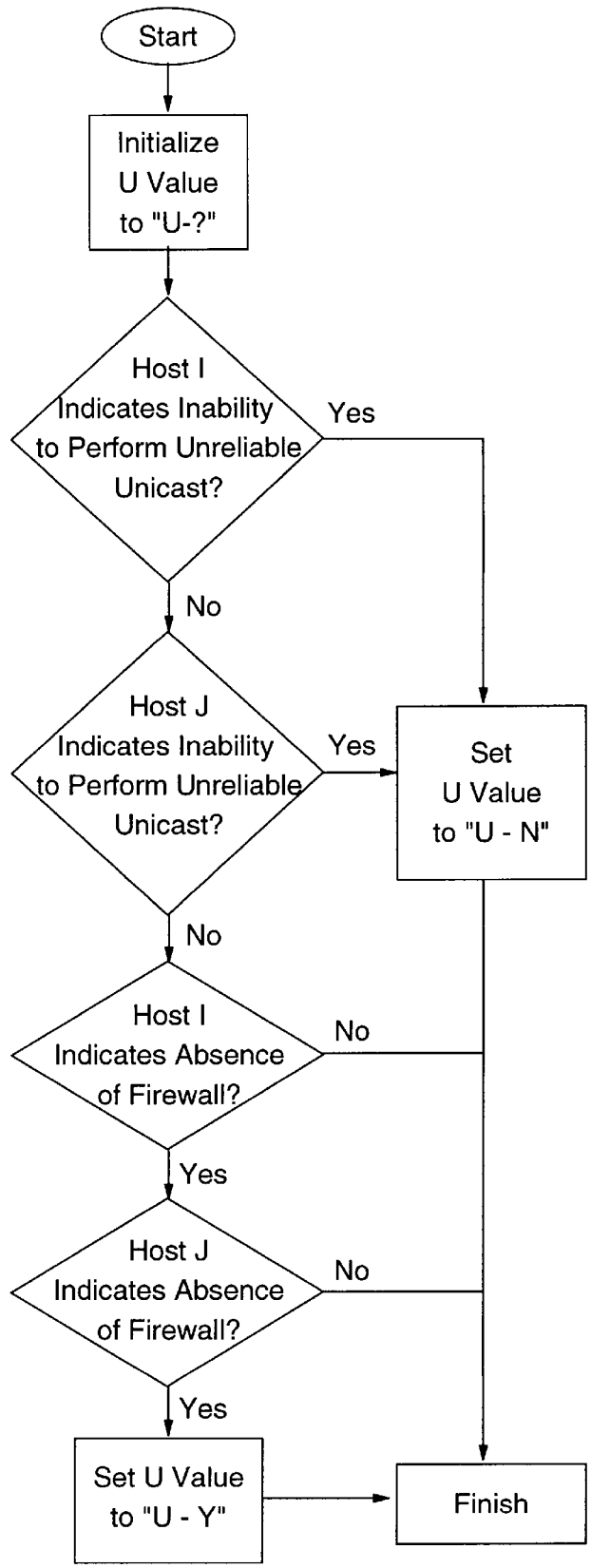
FIG. 4 is a flowchart showing the initialization process for the U value.

FIG. 4 shows a flowchart for how the U value of cell (I,J) is initialized. If either host indicated at registration that it cannot perform unreliable unicast communication, then the U value is initialized to U-N, and the process terminates. Otherwise, if both hosts indicate the absence of a firewall perimeter, then the U value is initialized to U-Y, and the process terminates. Otherwise, the U value is initialized to U-?, and a unicast reachability test from host I to host J is required to determine the appropriate (U-Y, if the test succeeds or U-N, if the test fails) U value for the cell.

The M value of cell (I, J) takes one of the following values:
  -M-? Unreliable multicast communication unconfirmed:
  -M-Y Unreliable multicast communication possible
  -M-N Unreliable multicast communication not possible The M-? value indicates that unreliable multicast communication may be possible from host I to host J but has not yet been confirmed. In the absence of any other information, this value is set as the default. The M-Y value is used when unreliable multicast communications are possible from host I to host J. This value is used as the default if, when registering with the server, both hosts indicate the ability to communicate via unreliable multicast and both hosts indicate the absence of a network firewall perimeter. This value may also be set after a multicast reachability test from host I to host J has succeeded. The M-N value is used when unreliable multicast communications are not possible from host I to host J. This value is used as the default if, when registering with the server, either host indicates that it cannot perform unreliable multicast communication. It may also be set after a multicast reachability test from host I to host J has failed.

Figure 5:
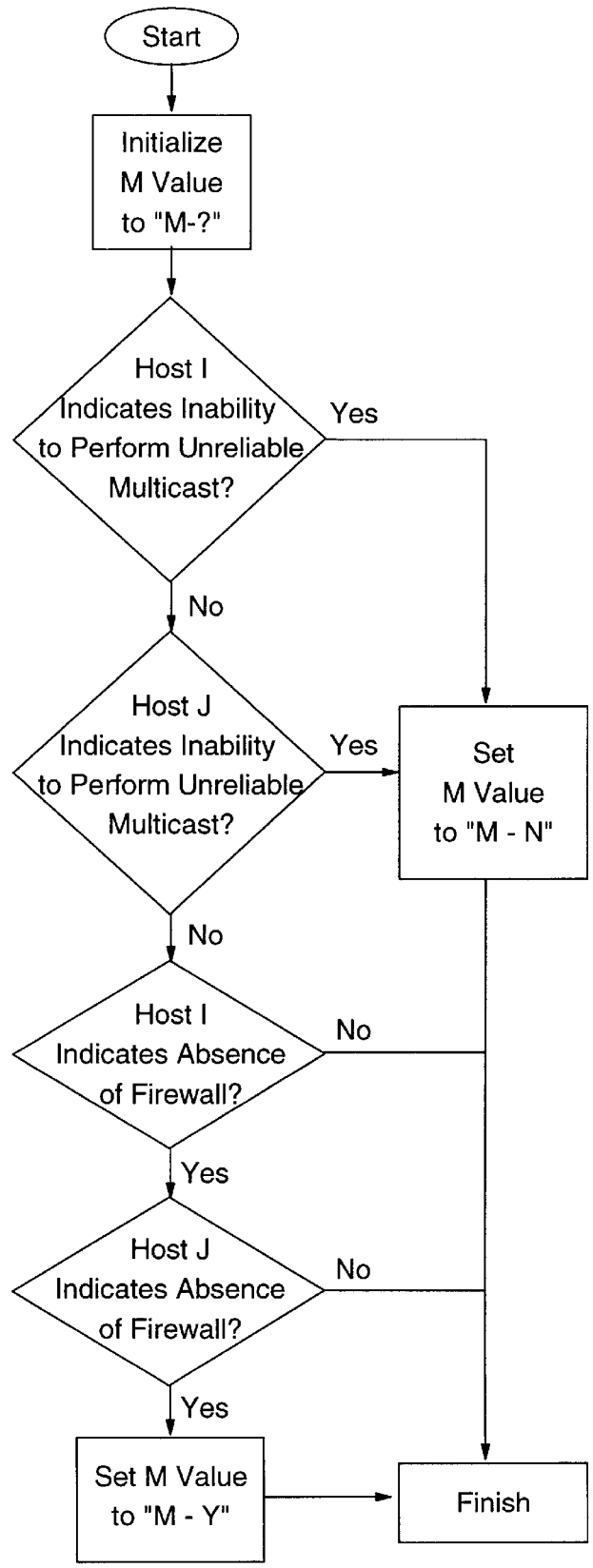
FIG. 5 is a flowchart showing the initialization process for the M value.

FIG. 5 shows a flowchart for how the M value of cell (I,J) is initialized. If either host indicated at registration that it cannot perform unreliable multicast communication, then the M value is initialized to M-N, and the process terminates. Otherwise, if both hosts indicate the absence of a firewall perimeter, then the M value is initialized to M-Y, and the process terminates. Otherwise, the M value is initialized to M-?, and a multicast reachability test from host I to host J is required to determine the appropriate (M-Y, if the test succeeds or M-N, if the test fails) M value for the cell.

Although we have described the initialization functions as involving only data that may have been provided by clients upon registering with the server, alternative implementations might also initialize the matrix by using information saved persistently from previous executions of the application server.

In the preferred embodiment of this invention, each host seeks to disseminate information to a plurality of destination hosts. The server uses its matrix data structure to ensure that each destination receives the data by the most efficient means. Though data in the preferred embodiment is destined to multiple destination hosts, the same techniques described herein are also applicable for facilitating one-to-one communications.

Figure 6:
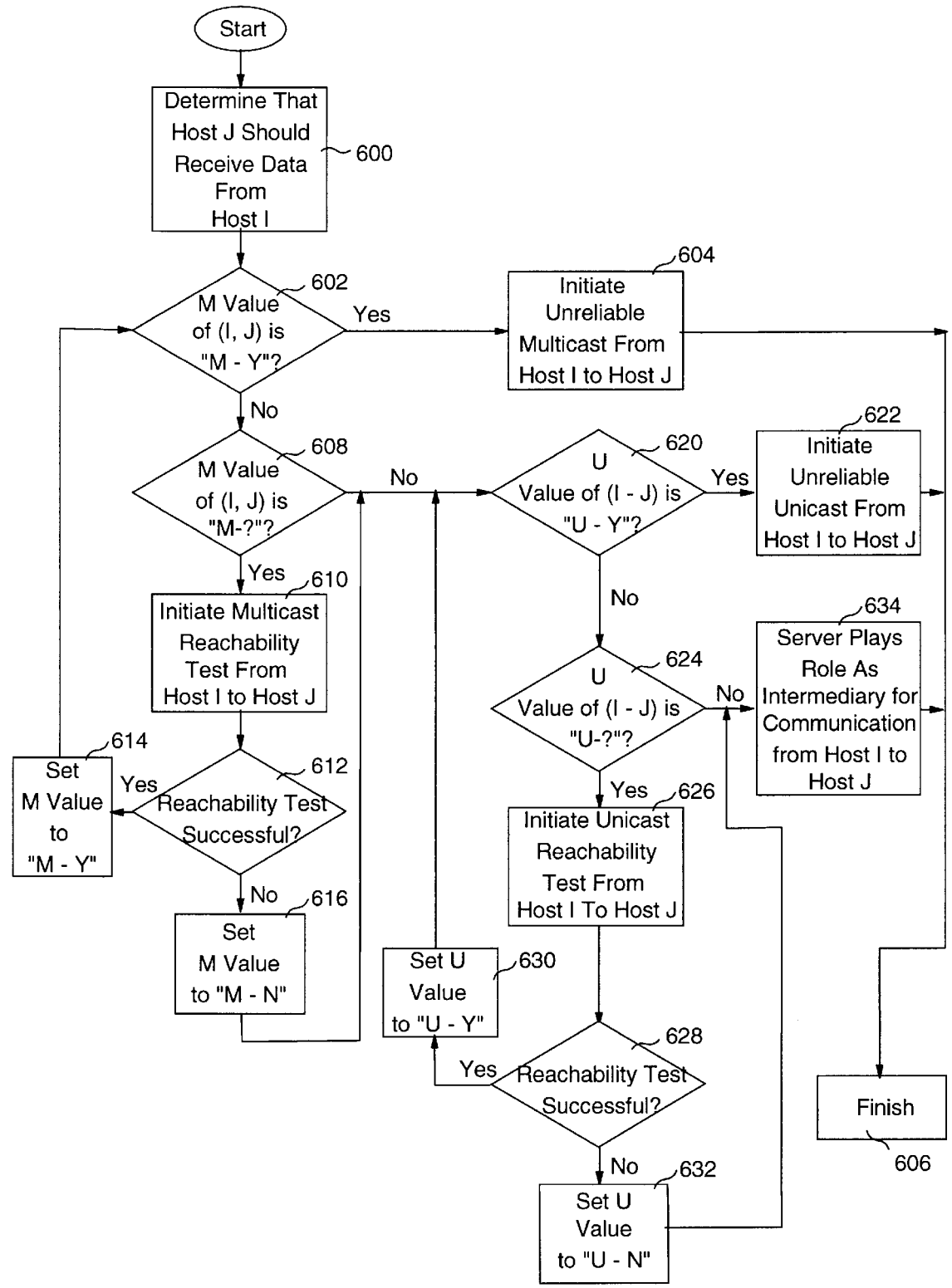
FIG. 6 is a flowchart showing how the server uses the U value and M value to establish communications between two client hosts.

FIG. 6 shows a flowchart illustrating how the server host ensures that data transmitted by a source host I is received by a destination host J. The server first determines that host J should receive data transmitted by host I at block 600. This determination may be made algorithmically by the server, or by request from host I or host J, or by request from some other host. The server next inspects the M value associated with cell (I,J) of the matrix at decision block 602. If the M value is M-Y, then the server at block 604 determines an appropriate multicast group address (either by using an address that host I is already transmitting to or by selecting a new address), notifies host J to join that multicast group, and ensures that host I transmits future data to that multicast address. The process then terminates at 606.

If the response to decision block 602 is no, it is determined at decision block 608 whether or not the M value is M-?. If the M value is M-?, then the server initiates a multicast reachability test from host I to host J at block 610. It is then determined at decision block 612 whether or not the test is successful. If the response to decision block 612 is yes, then the M value of cell (I,J) is set to M-Y at block 614 and the present invention returns to decision block 602. If the response to decision block 612 is no, then the M value of cell (I,J) is set to M-N at block 616.

If the M value is M-N, then unreliable multicast communications are not possible from host I to host J. Continuing in FIG. 6, subsequent to block 616 and if the response to decision block 608 is no, the server next inspects the U value associated with cell (I,J) in the matrix at decision block 620. If the U value is U-Y, then the server notifies host I to send data to host J via unreliable unicast communications at block 622, and the process terminates at 606.

If the response to decision block 620 is no, it is determined at decision block 624 whether or not the U value is U-?. If the response to decision block 624 is yes, the server initiates a unicast reachability test from host I to host J at block 626. It is then determined at decision block 628 whether or not the test was successful. If the response to decision block 628 is yes, then the U value of cell (I,J) is set to U-Y at block 630 followed by a return to decision block 620. If the response to decision block 628 is no, then the U value of cell (I,J) is set to U-N at block 632.

If the U value is U-N, then unreliable unicast communications are not possible from host I to host J. Continuing in FIG. 6, subsequent to block 632 or if the response to decision block 624 is no, the server determines that host I cannot send data directly to host J. Instead, it serves as an intermediary for transmitting data from host I to host J at block 634. Host I is instructed to send data to the server host, who, in turn, forwards it to host J.

Although in the preferred embodiment of this invention, this communication always takes place over a reliable unicast connection, the server might again refer to the matrix to enable this communication to take place using unreliable unicast or unreliable multicast communication. Once this communication is established, the process terminates at block 606.

In the preferred embodiment of this invention, in response to a U-N value in the matrix, the server becomes an intermediary for communication from host I to host J. However, alternative implementations may choose to permit direct reliable communications from host I to host J to take place.

To facilitate this alternative, the server would maintain a third value, an R value, for each cell (I,J) in its matrix data structure. This R value would indicate whether host I can transmit data to host J via reliable unicast communication. In response to a U-N value, the server would inspect the R value for cell (I,J).

The mechanism for initializing the R value, performing reliable unicast reachability tests, and responding to the various R values are nearly identical to those previously described above for the U value and M values and, therefore, will not be repeated. Alternative embodiments of this invention may introduce further values to each cell to indicate other communications capabilities such as encryption.

Figure 7:
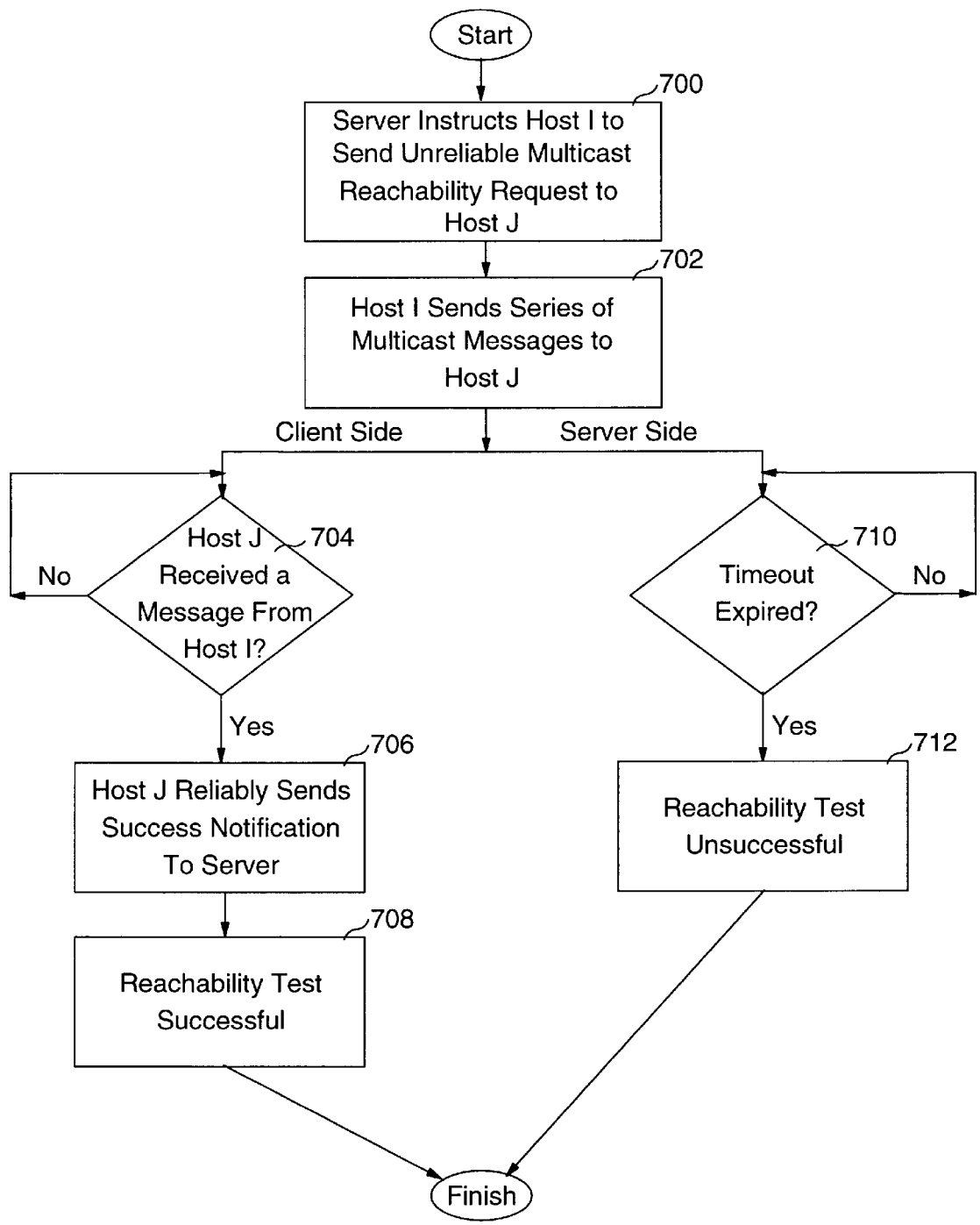
FIG. 7 is a flowchart showing the procedure for performing a multicast reachability test.

Referring now to FIG. 7, a flowchart describes how the server performs a multicast reachability test (block 610 in FIG. 6). This test is used to determine whether unreliable multicast communications are possible between a pair of hosts. Upon registering with the server, each host subscribes to a single multicast address which is reserved for reachability test messages. To perform a multicast reachability test from host I to host J, at block 700 the server instructs host I to send a "reachability request" to host J over this well-known multicast address. At block 702, host I sends a series of these messages, with a slight delay between successive transmissions, to counter the effects of packet loss. Upon receiving a multicast reachability request message at decision block 704 from host I, host J reliably notifies the server at block 706 that the multicast reachability test was successful at block 708. If the server does not receive a notification from host J (on the client side) within some timeout period at decision block 710, it then assumes at block 712 that the reachability test failed.

Figure 8:
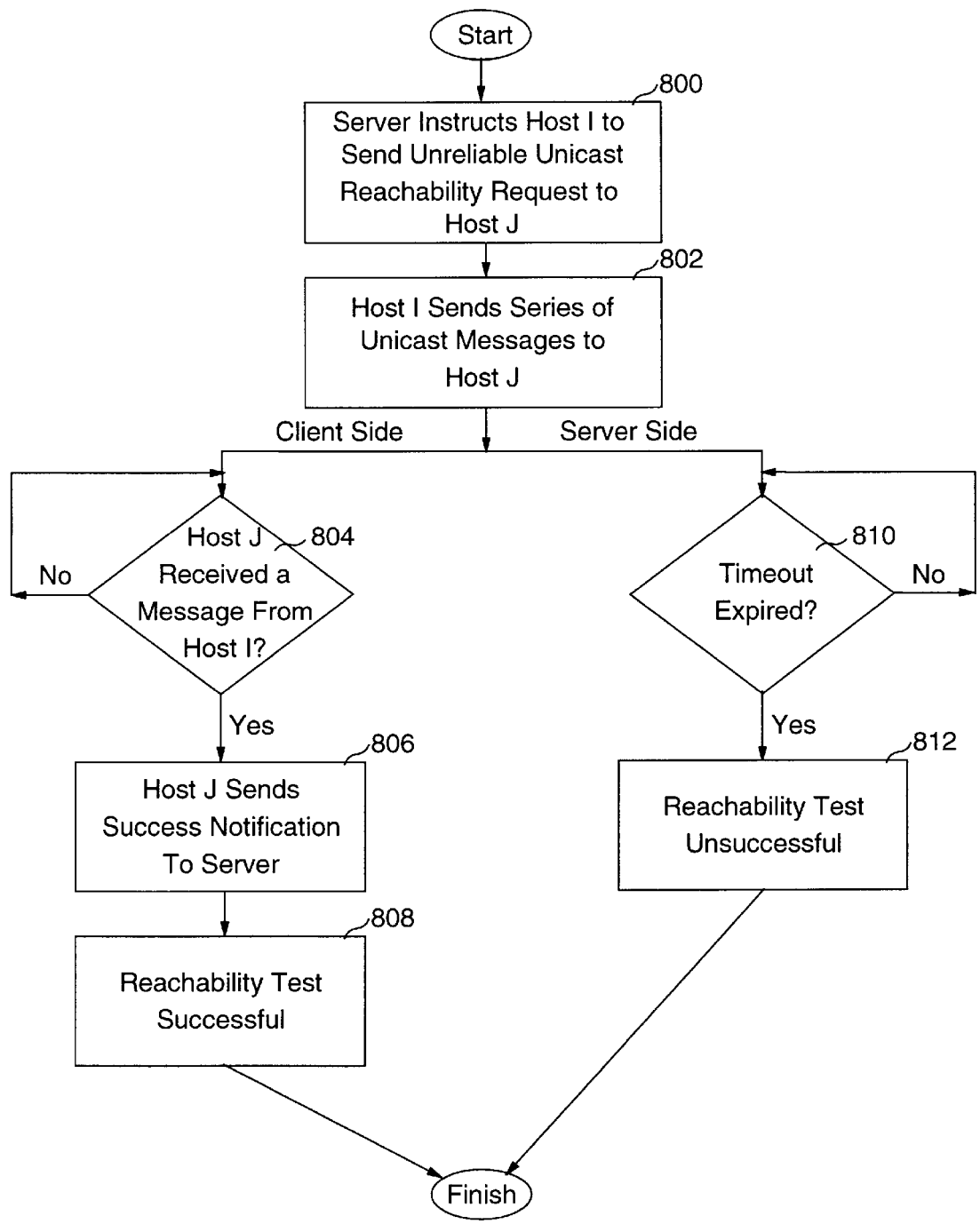
FIG. 8 is a flowchart showing the procedure for performing a unicast reachability test.

Referring now to FIG. 8, a flowchart describes how the server performs a unicast reachability test. This test is used to determine whether unreliable unicast communications are possible between a pair of hosts. To perform a unicast reachability test from host I to host J, the server at block 800 instructs host I to unreliably unicast a "reachability request" to host J. Host I sends at block 802 a series of these messages, with a slight delay between successive transmissions, to counter the effects of packet loss. Upon receiving a unicast reachability test message from host I at decision block 804, host J reliably notifies the server at block 806 that the unicast reachability test was successful at block 808. If the server does not receive a notification from host J within some timeout period at decision block 810, it then assumes that the reachability test failed at block 812.

As a result of the present invention, the server can determine the most efficient means for disseminating data from any client host to any one or more destination hosts. Consequently, the goals of complete and scalable connectivity can be achieved within a heterogenous internetwork environment.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of communicating between a plurality of network hosts in which each of the hosts has a different communication protocol capability, comprising the steps of:

initiating a first reachability test from a first host to at least one second host to determine whether or not unreliable multicast communications are possible; then selecting unreliable multicast communications as a communication type for communications between the first host and the at least one second host, if possible; then if unreliable multicast communications are not possible, initiating a second reachability test from said first host to said at least one second host to determine whether or not unreliable unicast communications are possible; then selecting unreliable unicast communications as a communication type for communicating between the first host and the at least one second host, if possible; and then communicating between the first host and the at least one second host utilizing communications of the selected communication type.

2. The method of claim 1, wherein results of said first and said second reachability tests are determined by static analysis of capability information furnished by said first host and said at least one second host at a registration time.

3. The method of claim 1, further comprising the steps of:

storing a first value to indicate whether unreliable multicast communications are possible, not possible, or not yet determined; and storing a second value to indicate whether unreliable unicast communications are possible, not possible, or not yet determined.

4. The method of claim 3, further comprising the step of:

creating a matrix to maintain a record of said first value and said second value.

5. The method of claim 1, wherein the step of communicating is preceded by the steps of:

if unreliable unicast communications and unreliable multicast communications are not possible, initiating a third reachability test from said first host to said at least one second host to determine whether or not reliable unicast communications are possible; and then selecting reliable unicast communications as a communications type for communications between the first host and the at least one second host, if possible.

6. The method of claim 5, wherein results of said first, second and third reachability tests are determined by static analysis of capability information furnished by said first host and said at least one second host at a registration time.

7. The method of claim 5, further comprising the steps of:

storing a first value to indicate whether unreliable multicast communications are possible, not possible, or not yet determined;

storing a second value to indicate whether unreliable unicast communications are possible, not possible, or not yet determined; and storing a third value to indicate whether reliable unicast communications are possible, not possible, or not yet determined.

8. The method of claim 7, further comprising the step of:

creating a matrix to maintain a record of said first value, said second value and said third value.

9. A system for communicating between a plurality of network hosts in which each of the hosts has a different communication protocol capability, comprising:

means for initiating a first reachability test from a first host to at least one second host to determine whether or not unreliable multicast communications are possible;

means for selecting unreliable multicast communications as a communications type for communications between the first host and the at least one second host, if possible;

means, responsive to said means for initiating a first reachability test, for determining if unreliable multicast communications are not possible;

means, responsive to said means for determining if unreliable multicast communications are not possible, for initiating a second reachability test from said first host to said at least one second host to determine whether or not unreliable unicast communications are possible;

means for selecting unreliable unicast communications as a communication type for communicating between the first host and the at least one second host, if unreliable unicast communications are possible; and means for communicating between the first host and the at least one second host utilizing communications of the selected communications type.

10. The system of claim 9, wherein results of said first and said second reachability tests are determined by static analysis of capability information furnished by said first host and said at least one second host at a registration time.

11. The system of claim 9, further comprising:

means for storing a first value to indicate whether unreliable multicast communications are possible, not possible, or not yet determined; and means for storing a second value to indicate whether unreliable unicast communications are possible, not possible, or not yet determined.

12. The system of claim 10, further comprising:

means for creating a matrix to maintain a record of said first value and said second value.

13. The system of Claim 9, further comprising:

means, responsive to said means for initiating a second reachability test, for determining if unreliable unicast communications are not possible;

means, responsive to said means for determining if unreliable unicast communications are not possible, for initiating a third reachability test from said first host to said at least one second host to determine whether or not reliable unicast communications are possible;

means, responsive to said means for initiating a third reachability test, for selecting reliable unicast communications as a communications type for communications between the first host and the at least one second host, if reliable unicast communications are possible.

14. The system of claim 13, wherein results of said first, second and third reachability tests are determined by static analysis of capability information furnished by said first host and said at least one second host at a registration time.

15. The system of claim 13, further comprising:

means for storing a first value to indicate whether unreliable multicast communications are possible, not possible, or not yet determined;

means for storing a second value to indicate whether unreliable unicast communications are possible, not possible, or not yet determined; and means for storing a third value to indicate whether reliable unicast communications are possible, not possible, or not yet determined.

16. The system of claim 15, further comprising:

means for creating a matrix to maintain a record of said first value, said second value and said third value.

17. A computer program product recorded on computer readable medium for communicating between a plurality of network hosts in which each of the hosts has a different communication protocol capability, comprising:

computer readable means for initiating a first reachability test from a first host to at least one second host to determine whether or not unreliable multicast communications are possible;

computer readable means for selecting unreliable multicast communications as a communications type for communications between the first host and the at least one second host, if possible;

computer readable means, responsive to said computer readable means for initiating a first reachability test, for determining if unreliable multicast communications are not possible;

computer readable means, responsive to said computer readable means for determining if unreliable multicast communications are not possible, for initiating a second reachability test from said first host to said at least one second host to determine whether or not unreliable unicast communications are possible;

computer readable means for selecting unreliable unicast communications as a communications type for communicating between the first host and the at least one second host, if unreliable unicast communications are possible; and computer readable means for communicating between the first host and the at least one second host utilizing the selected communications type.

18. The program product of claim 17, wherein results of said first and said second reachability tests are determined by static analysis of capability information furnished by said first host and said at least one second host at a registration time.

19. The program product of claim 17, further comprising:

computer readable means for storing a first value to indicate whether unreliable multicast communications are possible, not possible, or not yet determined; and computer readable means for storing a second value to indicate whether unreliable unicast communications are possible, not possible, or not yet determined.

20. The program product of claim 19, further comprising:

computer readable means for creating a matrix to maintain a record of said first value and said second value.

21. The program product of claim 20, further comprising:

computer readable means, responsive to said computer readable means for initiating a second reachability test, for determining if unreliable unicast communications are not possible;

computer readable means, responsive to said computer readable means for determining if unreliable unicast communications are not possible, for initiating a third reachability test from said first host to said at least one second host to determine whether or not reliable unicast communications are possible; and computer readable means for selecting reliable unicast communications as a communications type for communicating between the first host and the at least one second host, if reliable unicast communications are possible.

22. The program product of claim 21, wherein results of said first, second and third reachability tests are determined by static analysis of capability information furnished by said first host and said at least one second host at a registration time.

23. The program product of claim 21, further comprising:

computer readable means for storing a first value to indicate whether unreliable multicast communications are possible, not possible, or not yet determined;

computer readable means for storing a second value to indicate whether unreliable unicast communications are possible, not possible, or not yet determined; and computer readable means for storing a third value to indicate whether reliable unicast communications are possible, not possible, or not yet determined.

24. The program product of claim 23, further comprising:

computer readable means for creating a matrix to maintain a record of said first value, said second value and said third value.

* * * * *